US011542166B2

(12) United States Patent
Rustine et al.

(10) Patent No.: US 11,542,166 B2
(45) Date of Patent: Jan. 3, 2023

(54) APPARATUS AND METHOD FOR EXFOLIATING GRAPHITE

(71) Applicant: TMTP Labs, Inc., New Orleans, LA (US)

(72) Inventors: Timothy Rustine, Metairie, LA (US); Matthew Kelly, Baton Rouge, LA (US); Seann Robbins, New Orleans, LA (US)

(73) Assignee: TMTP Labs, Inc., New Orleans, LA (US)

( * ) Notice: Subject to any disclaimer, the term of this patent is extended or adjusted under 35 U.S.C. 154(b) by 0 days.

(21) Appl. No.: 17/736,034

(22) Filed: May 3, 2022

(65) Prior Publication Data

US 2022/0356063 A1    Nov. 10, 2022

Related U.S. Application Data

(60) Provisional application No. 63/184,176, filed on May 4, 2021.

(51) Int. Cl.
*C01B 32/225*    (2017.01)
*B01F 35/90*    (2022.01)
(Continued)

(52) U.S. Cl.
CPC ............ *C01B 32/225* (2017.08); *B01F 31/40* (2022.01); *B01F 31/60* (2022.01); *B01F 2035/98* (2022.01)

(58) Field of Classification Search
CPC ....... B02C 17/14; B02C 17/186; B02C 17/24; B01F 31/201; B01F 31/25; B01F 31/70;
(Continued)

(56) References Cited

U.S. PATENT DOCUMENTS

| 2,448,927 A | * | 9/1948 | Fischer | C12M 47/02 366/144 |
| 4,670,397 A | * | 6/1987 | Wegner | F24V 99/00 435/243 |
| 4,838,702 A | * | 6/1989 | Torimitsu | A23G 9/228 366/144 |
| 5,369,032 A | * | 11/1994 | Pratt | A01K 67/033 366/147 |

(Continued)

FOREIGN PATENT DOCUMENTS

| CN | 105439133 B | 3/2016 |
| CN | 105668562 A | 6/2016 |

(Continued)

OTHER PUBLICATIONS

Makadia et al., "The Freeze-Thaw Technique for Exfoliation of Graphite: A Novel Approach for Bulk Production of Scroll-Free Graphene Oxide Sheets," Mar. 2017, Advanced Materials Letters, downloaded from https://aml.iaamonline.org/article_14999_708bcabda26ddb3b648a163b1492359f.pdf, pp. 262-264.

(Continued)

*Primary Examiner* — Charles Cooley
(74) *Attorney, Agent, or Firm* — Hard IP LLC

(57) ABSTRACT

An apparatus and method to exfoliate a graphite grain is described. A mixture of a graphite grain and a fluid medium are transferred into a vessel. The vessel includes an agitator and a chiller. The chiller chills the mixture such that the fluid medium at least partially solidifies into an ice grain. The agitator agitates the mixture to induce a contact between the graphite grain and the ice grain. The contact between the graphite grain and the ice grain exfoliates the graphite grain.

10 Claims, 5 Drawing Sheets

(51) Int. Cl.
*B01F 31/60* (2022.01)
*B01F 31/40* (2022.01)

(58) Field of Classification Search
CPC ...... B01F 31/40; B01F 31/60; B01F 2035/98; B82Y 30/00; B82Y 40/00; C01B 32/182; C01B 32/19; C01B 32/225; C01B 2204/02; C01B 2204/04; C01B 2204/32; F16C 3/02; F16H 1/20; F16H 1/22; F16H 37/065; F16H 53/00; F16H 53/02; F16H 55/17; F16H 2055/176; C01P 2006/12; Y10T 74/19051; Y10T 74/1987; Y10T 74/19949; Y10T 74/2101; Y10T 428/2991
USPC ........................................................ 366/149
See application file for complete search history.

(56) References Cited

U.S. PATENT DOCUMENTS

| | | | |
|---|---|---|---|
| 7,071,258 B1 | 7/2006 | Jang et al. | |
| 9,206,051 B2* | 12/2015 | Murray | F16H 1/22 |
| 9,321,652 B2* | 4/2016 | Paquette | C01B 32/23 |
| 9,452,934 B2 | 9/2016 | Kim et al. | |
| 9,682,380 B2* | 6/2017 | Murray | F16H 53/00 |
| 10,322,935 B2* | 6/2019 | Bozalina | C09D 1/00 |
| 2004/0062140 A1* | 4/2004 | Cadogan | B01F 35/513 366/144 |
| 2008/0258359 A1 | 10/2008 | Zhamu et al. | |
| 2010/0266476 A1* | 10/2010 | Paquette | C01B 32/23 34/284 |
| 2013/0260152 A1* | 10/2013 | Murray | F16H 53/00 977/734 |
| 2016/0069444 A1* | 3/2016 | Murray | C01B 32/182 74/665 A |
| 2016/0199845 A1* | 7/2016 | Murray | F16H 1/20 74/665 F |
| 2016/0272501 A1* | 9/2016 | Lipinska | C01B 32/19 |

FOREIGN PATENT DOCUMENTS

| | | |
|---|---|---|
| CN | 106809818 A | 6/2017 |
| CN | 105523553 B | 7/2017 |
| CN | 107879326 A | 4/2018 |
| CN | 110127679 A | 8/2019 |
| KR | 20130004638 A * | 1/2013 |
| KR | 101866644 B1 | 1/2018 |
| WO | 2014187796 A1 | 11/2014 |
| WO | 2015181362 A1 | 12/2015 |
| WO | 2017089818 A1 | 6/2017 |
| WO | 2022101663 A1 | 5/2022 |

OTHER PUBLICATIONS

Zhu et al., "One-Step Preparation of Graphene Nanosheets Via Ball Milling of Graphite and the Application in Lithium-Ion Batteries," Jan. 6, 2016, Springer, downloaded from https://link.springer.com/article/10.1007/s10853-015-9655-z, pp. 1-9.

Ogino et al., "Sonication-Free Exfoliation of Graphite Oxide Via Rapid Phase Change of Water," Apr. 2, 2015, Springer, downloaded from https://link.springer.com/article/10.1007/s11244-015-0391-z, pp. 1-7.

Ogino et al., "Exfoliation of Graphite Oxide in Water without Sonication: Bridging Length Scales from Nanosheets to Macroscopic Materials," Chem. Mater, Apr. 29, 2014, downloaded from https://pubs.acs.org/doi/abs/10.1021/cm501305c, 10 pgs.

Munuera et al., "Electrolytic exfoliation of graphite in water with multifunctional electrolytes: en route towards high quality, oxide-free graphene flakes," Nanoscale, Jan. 5, 2016, downloaded from https://pubs.rsc.org/en/content/articlelanding/2016/nr/c5nr06882g, 5 pgs.

Yi et al., "A review on mechanical exfoliation for the scalable production of graphene," Journal of Materials Chemistry A, Royal Society of Chemistry, Mar. 10, 2015, downloaded from https://ins.nuaa.edu.cn/attached/upload/file/20201205/637427604478354142297413l.pdf, 16 pgs.

Jeon et al., "Edge-carboxylated graphene nanosheets viaball milling," Mar. 27, 2012, downloaded from https://www.pnas.org/doi/10.1073/pnas.1116897109, 13 pgs.

Liang et al., "One-step green synthesis of graphene nanomesh by fluid-based method," Apr. 2, 2014, downloaded from https://arxiv.org/ftp/arxiv/papers/1611/1611.00180.pdf, 5 pgs.

Xu et al., "Liquid-Phase Exfoliation of Graphene: An Overview on Exfoliation Media, Techniques, and Challenges," Nov. 15, 2018, downloaded from https://www.mdpi.com/2079-4991/8/11/942/htm, 79 pgs.

Lin et al., "Facile and economical exfoliation of graphite for mass production of high-quality graphene sheets," Journal of Materials Chemistry A, Nov. 20, 2012, downloaded from https://pubs.rsc.org/en/content/articlelanding/2013/ta/c2ta00518b/unauth, 4 pgs.

Loryuenyong et al., "Preparation and Characterization of Reduced Graphene Oxide Sheets via Water-Based Exfoliation and Reduction Methods," Sep. 8, 2013, downloaded from https://www.hindawi.com/journals/amse/2013/923403/, 12 pgs.

Hu et al., "Exfoliation of poly (ethylene glycol)-intercalated Graphite Oxide composite in water without sonication," International Journal of Minerals, Metallurgy and Materials, 2019, downloaded from http://ijmmm.ustb.edu.cn/fileKWYJYCLXB/journal/article/ijmmm/newcreate/2019-0415.pdf,14pgs.

Amiri et al., "Facile, Environmentally Friendly, Cost Effective and Scalable Production of Few-Layered Graphene," Chemical Engineering Journal, 2017, pp. 1-33, obtainable from https://www.sciencedirect.com/science/article/abs/pii/S138589471730997X?via%3Dihub.

Ogino et al., "Exfoliation of Graphite Oxide in Water without Sonication: Bridging Length Scales from Nanosheets to Macroscopic Materials," Chem. Mater, Apr. 29, 2014, pp. 3334-3339.

WIPO, International Search Report and Written Opinion received in International Application No. PCT/US2022/027526, dated Mar. 26, 2022, (8p.).

* cited by examiner

APPARATUS AND METHOD FOR EXFOLIATING GRAPHITE

CROSS REFERENCE TO RELATED APPLICATION

This application claims the benefit under 35 U.S.C. § 119(e) of the filing date of U.S. provisional application No. 63/184,176 filed on May 4, 2021, the content of which is incorporated herein by reference in its entirety.

FIELD

The present disclosure generally relates to an apparatus and method for exfoliating graphite, and, in particular, it relates to an apparatus and method for exfoliating graphite grains to produce graphene using a fluid medium.

BACKGROUND

Since its isolation in 2004, graphene has been a highly sought-after commodity. Consisting of a single layer of carbon atoms, this material has been theorized and demonstrated to possess remarkable properties, including a high tensile strength, high flexibility, high thermal conductivity, and extremely high electrical conductivity. The applications for this material abound and increase with each year of research and development.

However, the demand for graphene far exceeds the capability of existing techniques for producing it. The first technique to produce graphene, known informally as the "Scotch tape method," includes the steps of emplacing a strip of tape on the surface of a graphite block and peeling it away to mechanically exfoliate a thin sheet of graphite, emplacing a second strip of tape on top of the first strip of tape and peeling it away to exfoliate a thinner sheet of graphite; this process is repeated until exfoliated flakes of monolayer graphene are finally affixed to a strip of tape. Although monolayer graphene may be produced, this technique requires an enormous expenditure of labor and time as well as the consumption of copious amounts of tape and solvents to remove said tape and isolate the graphene flakes. This process is also not only tedious, time-consuming, and costly but not environmentally friendly due to the waste produced.

Additional techniques have been developed in the years since the introduction of the "Scotch tape method," falling into the broad categories of "bottom-up" and "top-down" methodologies. Bottom-up techniques, such as Chemical Vapor Deposition, assemble graphene directly at a nanoscale from free carbon atoms. Bottom-up techniques are capable of producing sheets of graphene of configurable size but are limited by the fact that they produce only a single sheet of graphene at a time. Top-down techniques, such as the "Scotch tape method," rely on the fact that naturally occurring graphite already includes stacked layers of graphene that are held together by weak van der Waals forces and seek to exfoliate these layers to isolate the graphene. Van der Waals forces include attraction and repulsion between atoms, molecules, and surfaces, as well as other intermolecular forces.

Traditional exfoliation techniques, however, are also limited by their efficiency as well as the quality of their final product. As previously discussed, the "Scotch tape method" requires an inordinate expenditure of labor and material and is disadvantageous for large-scale, industrial production of graphene. Other techniques, such as chemical exfoliation and liquid phase shear mixing, may be feasible for industrial production but produce a final product that is either compromised by oxidation or limited to a slow production rate that drives up the production cost.

High-energy techniques that may produce graphene at a high rate and quality include laser-induced graphene ("LIG") and flash Joule heating ("FJH"). These techniques allow the use of non-graphitic base materials that contain carbon, such as rubber or organic waste, and may produce graphene at higher rates than previously discussed techniques. However, these techniques are limited by the intrinsic safety risk and cost of high-energy systems.

Thus, there exists a high demand for novel techniques of producing graphene that are safe and scalable to industrial levels. Further, as the current price of graphene is a limiting factor for the introduction of novel products leveraging the many useful features of the material, there exists a demand for novel techniques of producing graphene that are inexpensive.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, an apparatus and method for exfoliating graphite to produce graphene is provided. A mixture is transferred into a vessel. The mixture includes a graphite grain and a fluid medium. The vessel includes an agitator. The mixture may be agitated by an agitator to produce a contact between the graphite grain and the ice grain to exfoliate the graphite grain.

In an implementation, a mixture may be transferred into a vessel. The mixture includes a graphite grain and a fluid medium. The vessel includes an agitator and a chiller. The mixture is chilled by the chiller such that the fluid medium at least partially solidifies into an ice grain. The mixture is agitated by an agitator to induce a contact between the graphite grain and the ice grain to exfoliate the graphite grain.

In an implementation, an apparatus to exfoliate a graphite grain includes a vessel to contain a mixture. The vessel includes a chiller and an agitator. The mixture includes a graphite grain and a fluid medium. The chiller is configured to chill the mixture to at least partially solidify the fluid medium into an ice grain. The agitator is configured to agitate the mixture to induce a contact between the graphite grain and the ice grain to exfoliate the graphite grain.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
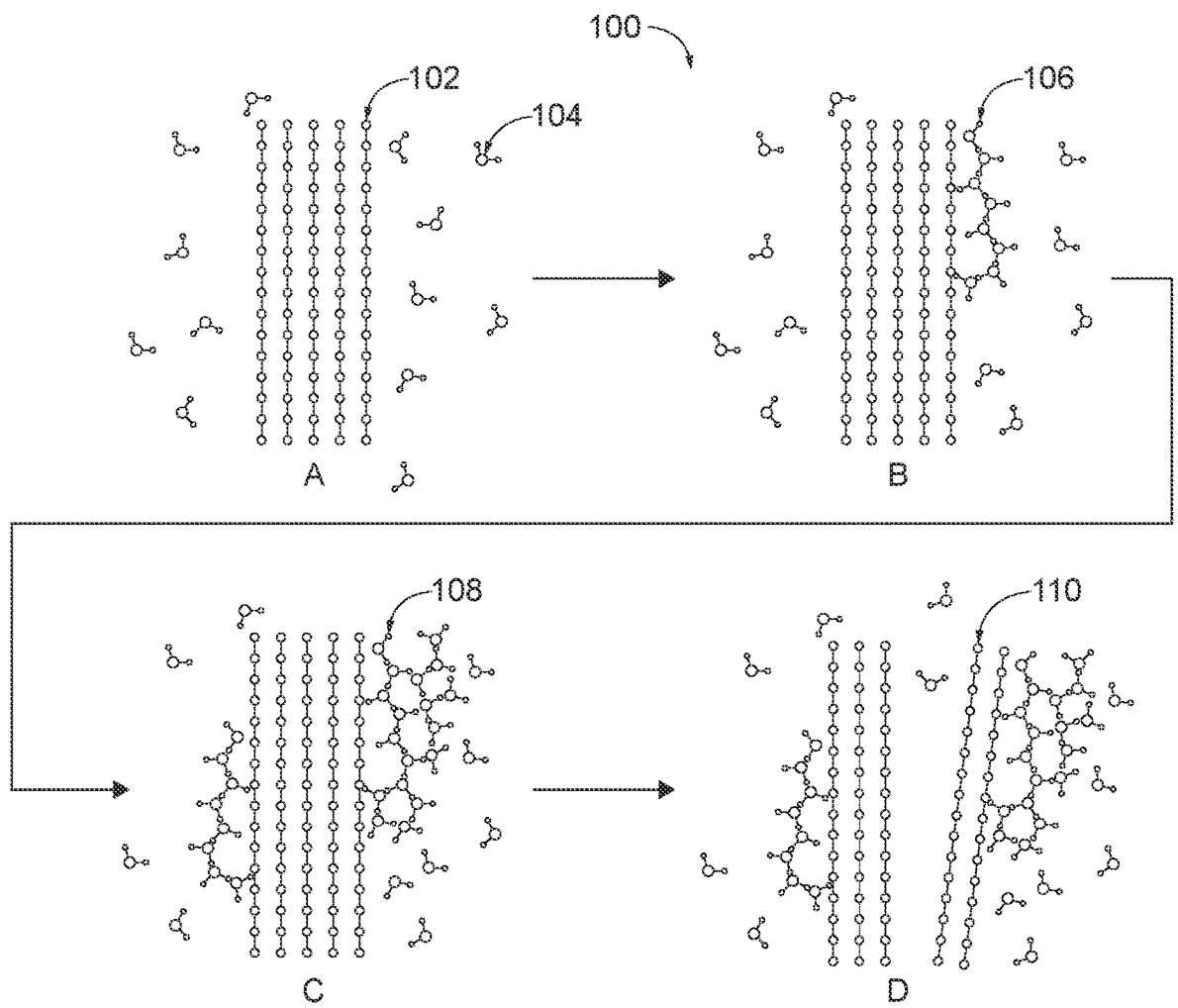
FIG. 1 illustratively depicts a series of contacts between a graphite grain and a fluid medium at a molecular scale, in accordance with an implementation of the disclosure.

Before the present subject matter is described in detail, it is to be understood that this disclosure is not limited to the particular implementations described, as such may vary. It should also be understood that the terminology used herein is to describing particular implementations only, and is not intended to be limiting, since the scope of the present disclosure will be limited only by the appended claims. While this disclosure is susceptible to different implementations in different forms, there is shown in the drawings and will here be described in detail a preferred implementation of the disclosure with the understanding that the present disclosure is to be considered as an exemplification of the principles of the disclosure and is not intended to limit the broad aspect of the disclosure to the implementation illustrated. All features, elements, components, functions, and steps described with respect to any implementation provided herein are intended to be freely combinable and substitutable with those from any other implementation unless otherwise stated. Therefore, it should be understood that what is illustrated is set forth only for the purposes of example and should not be taken as a limitation on the scope of the present disclosure.

As used herein, "fluid" refers to a continuous, amorphous substance whose molecules move freely past each other and has a tendency to assume a shape of a container. Fluids include both liquids and gases. Fluids may flow under certain conditions, such as when exposed to pressure or gravity.

As used herein, "grain" refers to a particle of a solid material whose constituents (such as atoms, molecules, or ions) are arranged in a highly ordered microscopic structure, forming a crystal lattice that extends in all directions. A grain may include crystallographic defects, such as vacancies, dislocations, impurities, and interstitial additions.

As used herein, "exfoliate" refers to the action of dividing a grain of a layered material. The layered material may include any number of layers prior to exfoliation. During exfoliation, the grain is divided into a first new grain and a second new grain, with the number of layers prior to exfoliation divided between the first new grain and the second new grain. The action of exfoliation may continue upon the first new grain and/or the second new grain to produce additional new grains.

As used herein, "graphene" refers to a single layer ("monolayer") of carbon atoms, arranged in a hexagonal bond pattern. As used herein, "multi-layer graphene" refers to a structure consisting of between 2 and 10 layers of graphene stacked upon each other and held together by van der Waals forces. As used herein, "nanographite" refers to a structure consisting of between 10 and 1000 layers of graphene stacked upon each other and held together by van der Waals forces. As used herein, "graphite" refers to a structure consisting of more than 1000 layers of graphene stacked upon each other and held together by van der Waals forces. However, any of these terms may be used interchangeably and one method that produces particular layer(s) of graphene may also produce other layer(s) of graphene without departing from the spirit and scope of the present disclosure.

As discussed above, graphene is a highly sought-after material with attractive properties. For instance, graphene flakes may be used as an additive to other materials to raise their flexural or compressive strength. In addition, its conductivity is being investigated for use in supercapacitors and as a replacement for copper in some applications. Preliminary research suggests that graphene may also be utilized as a filter in desalination systems at attractively low energy usage rates.

However, existing methods to produce graphene have been limited by factors such as a low rate of production and high and costly requirements of labor and/or materials. Existing methods that successfully overcome the challenges of production and scalability suffer from other challenges. As the most attractive characteristics of graphene are a result of its repeating hexagonal pattern of carbon atoms, the presence of defects can interfere with its utility. For instance, the benefits of graphene are reduced when the structure of the carbon atoms is compromised by oxidation. While graphene oxide may be reduced to form reduced graphene oxide, the final product contains defects which also reduce its efficacy. Furthermore, some methods advertised by suppliers as producing mono-layer graphene actually produce multi-layer graphene or even nanographite, which hold in common only a fraction of the beneficial effects of graphene. For example, the strength and conductivity of graphene are reduced by the presence of additional layers.

The present disclosure addresses the challenges faced by existing solutions by introducing a method and apparatus for exfoliating graphite to produce graphene which is highly scalable, requires a low cost of labor and materials, may produce a high-quality finished product, and presents minimal safety risks.

As described herein, the adhesive properties of a crystalline structure may be employed to grip and mechanically exfoliate layer(s) of graphite to produce one or more layers of graphene. For example, ice may be employed as a crystalline structure. Water ice is a well-researched substance with mature regulations and risk data. The temperature and pressure at which ice forms is achievable with minimal energy expenditure and minimal risk to personnel and the environment. The labor, materials and equipment required by this solution are inexpensive and may be scaled readily to bulk industrial production for sale at a cost-effective price point.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one implementation, to A only (optionally including entities other than B); in another implementation, to B only (optionally including entities other than A); in yet another implementation, to both A and B (optionally including other entities). These entities may refer to elements, actions, structures, steps, operations, values, and the like.

Various aspects of the above referenced system are described in detail herein by way of examples, rather than by way of limitation.

FIG. 1 illustratively depicts a series of contacts 100 between a graphite grain 102 and a fluid medium 104 at a molecular scale. FIG. 1 depicts four series of steps (steps A-D) for exfoliating a graphite grain described in detail below. The series of contacts 100 includes a crystalline structure layer 106, a crystalline structure 108, and an exfoliated graphite grain 110. For the purpose of simplicity, FIG. 1 depicts a two-dimensional side view with individual atoms depicted as circles and bonds between atoms depicted as lines. For simplicity and brevity, FIG. 1 depicts a graphite grain 102 including multi-layer graphene with five vertical layers of graphene stacked next to each other and held together by van der Waals forces. As discussed above, each graphene layer includes carbon atoms arranged in a hexagonal bond pattern. It should be noted that the process described below is expected to respond similarly regardless of the number of layers in the graphite grain 102. Therefore, more or less layers than depicted may be used. Furthermore, although one graphite grain 102 is depicted in FIG. 1 for simplicity and brevity, additional graphite grains may be interacting with the fluid medium 104.

In step A, the graphite grain 102 is suspended as a solid particle in a fluid medium 104. As depicted in FIG. 1, the fluid medium 104 may include a plurality of constituents (e.g., atoms, ions, or molecules). In one implementation, the fluid medium 104 may be a solution that includes water. In another implementation, the fluid medium 104 may be an aqueous solution containing water buffered by a buffering agent, such as acetic acid, citric acid, formic acid, borate, or potassium dihydrogen phosphate. In a third implementation, the fluid medium 104 may include an abrasive material, such as silica, calcite, or diamond dust. The fluid medium 104 may include a surfactant (e.g., soap, an alkyl sulfate, an alkylbenzene sulfonate, a lignosulfonate, n-methyl-2-pyrrolidone, sodium cholate, etc.) to alter the characteristics of the fluid medium 104. The fluid medium 104 may also include a freezing point depressant (e.g., ethylene glycol, methyl alcohol, propyl alcohol or derivatives thereof, ethyl alcohol, sugar, etc.) to reduce the freezing temperature of the fluid medium 104. In other implementations, the fluid medium 104 may be other fluids, other fluid solutions or other solutions existing in other state(s).

After step A, in step B of FIG. 1, a thermal sink such as a cooling plate (not depicted) is used to cool the fluid medium 104 at or below a freezing temperature. As used herein, "freezing temperature" refers to the temperature at which a material may begin to change thermodynamic phase from a liquid to a solid. The process of changing thermodynamic phase from a liquid to a solid is also referred to as "solidifying." A liquid solidifying into a crystalline structure may preferentially solidify onto other solids in a process referred to as "nucleation." Solids onto which a crystalline structure may begin to solidify are referred to as "nucleation sites." In the present disclosure, as the fluid medium 104 solidifies, two or more of the fluid medium 104 molecules bond to one another in a repeating pattern to form a crystalline structure layer 106.

In an implementation, the freezing temperature is that of pure water, which is approximately 0° Celsius under one atmosphere of pressure. In response to cooling at or below the freezing temperature, the fluid medium 104 begins to solidify to a crystalline structure layer 106. The fluid medium 104 may solidify to a crystalline structure layer 106 on a nucleation site. The graphite grain 102 may serve as a nucleation site for the crystalline structure layer 106. In an implementation, the fluid medium 104 may be selected such that the crystalline structure layer 106 adheres to an outer layer of the graphite grain 102 as the fluid medium 104 freezes.

After step B, in step C of FIG. 1, the thermal sink (not depicted) continues to cool the fluid medium 104 below the freezing temperature to remove latent heat and cause additional freezing of the fluid medium 104. In response to the continued cooling, the fluid medium 104 continues to solidify, and the crystalline structure layer 106 grows to form a crystalline structure 108. In an implementation, the crystalline structure 108 may continue to grow (e.g., get larger and the fluid medium 104 molecules continue to bond with others) until the fluid medium 104 is completely solidified or the thermal sink (not depicted) ceases to cool the fluid medium 104. The thermal sink (not depicted) may cease to cool the fluid medium 104 in response to a command from a user, in response to an automated command, or upon loss of power.

After step C, in step D, the device to create agitation (i.e., the agitator) (not depicted) continues to agitate the graphite grain 102, the crystalline structure 108, and the fluid medium 104. As used herein, "agitate" refers to raising the kinetic energy of a substance. For example, a rotating blade or vibration source may be used to agitate a substance by introducing kinetic energy. In an implementation, continued growth of the crystalline structure 108 may increase the force induced by resistance to motion within a fluid (also referred to as "fluid drag") between the crystalline structure 108 and the fluid medium 104. As the fluid drag increases, a force is transferred from the crystalline structure 108 to the graphite grain 102. Ultimately, the tension transferred to the graphite grain 102 may exceed the forces holding the layers of graphite together (also referred to as "interlayer bond strength") created by the van der Waals forces. As a result, the interlayer bond strength may be overcome and the crystalline structure 108 may thus be mechanically separated from the graphite grain 102.

In an implementation, the fluid medium 104 is selected such that the adhesive strength of the crystalline structure 108 is greater than the interlayer bond strength of the graphite grain 102. As a result, the outer layer of the graphite grain 102, to which the crystalline structure 108 is adhered, may be exfoliated from the graphite grain 102 with the crystalline structure 108. Following this exfoliation, an exfoliated graphite grain 110 is divided away from the graphite grain 102.

In an implementation, the newly exposed outer layer of the exfoliated graphite grain 110 may then serve as a nucleation site upon which grains begin to solidify for continued development of a crystalline structure layer 106 and a crystalline structure 108. Thus, steps A through D in FIG. 1 may be repeated upon the exfoliated graphite grain 110 to further exfoliate the graphite. Through repetition of steps A through D (i.e., performing steps A through D and repeating these steps again and again), the series of contacts 100 as described above may reduce graphite to nanographite, multi-layer graphene, and ultimately graphene. In an implementation, graphite is exfoliated to multi-layer graphene within two hours of repetition of steps A through D. Graphite may be exfoliated to graphene within any other time frame in other implementations. Additional details are provided below regarding several implementations whereby the technique described above may be achieved in a scalable and cost-effective manner.

Figure 2:
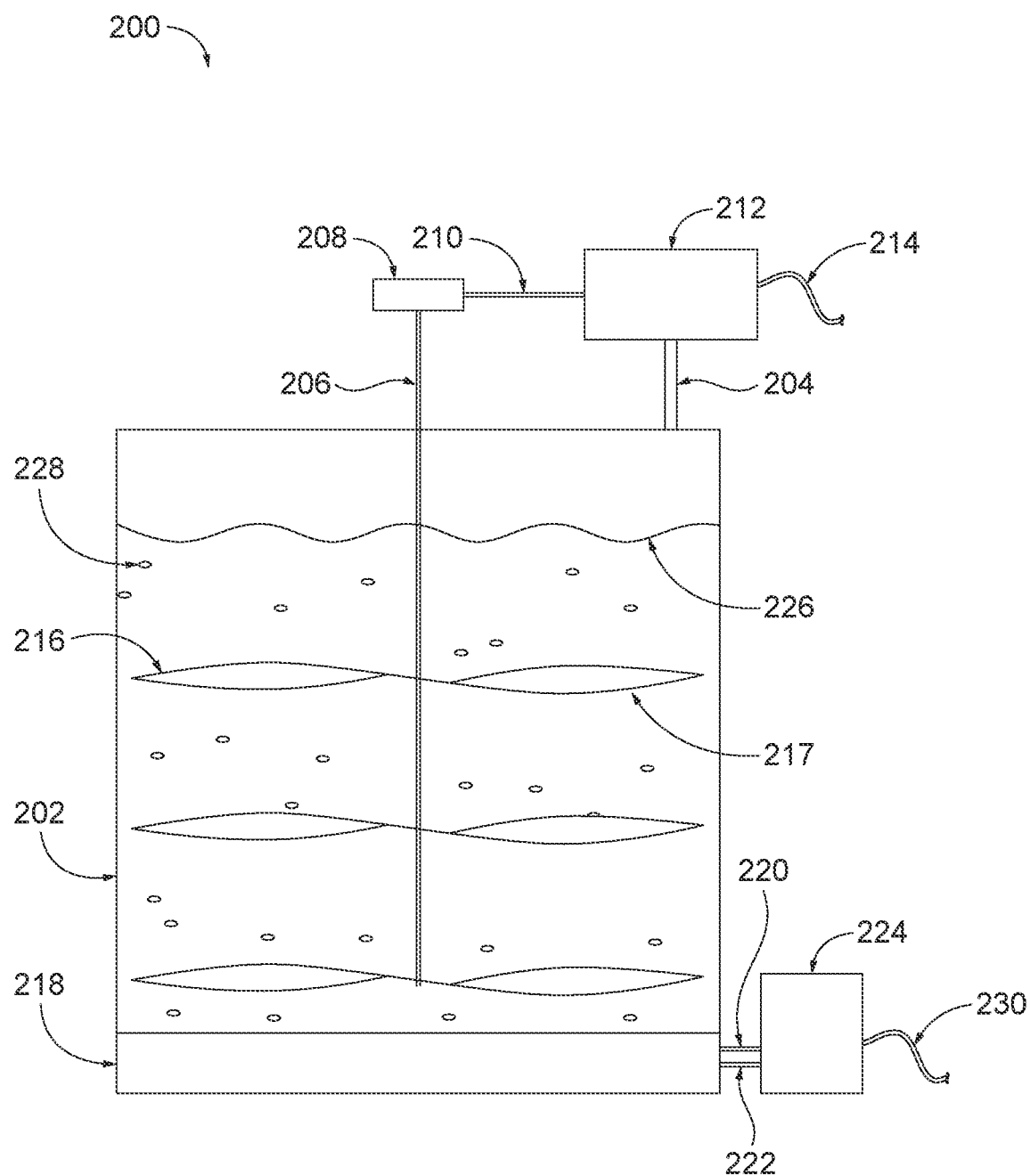
FIG. 2 illustratively depicts an apparatus for exfoliating graphite, in accordance with an implementation of the disclosure.

FIG. 2 illustratively depicts an apparatus 200 for exfoliating graphite. The apparatus 200 for exfoliating graphite includes a vessel 202, an agitator 216, and a thermal sink 218. The vessel 202 includes or otherwise houses a fluid medium 226 and at least a graphite grain 228. The agitator 216 includes a motor 212, an input shaft 210, a gear box 208, and an output shaft 206. The thermal sink 218 includes a coolant inlet 220, a coolant outlet 222, and a chiller 224. The motor 212 includes a support arm 204 and a motor electric input 214. The chiller 224 includes a chiller electric input 230.

The vessel 202 may be created or otherwise manufactured to hold any volume of a fluid medium as determined by a designer of the apparatus 200. In an implementation, the vessel 202 is constructed from one or more, or a combination, of the following materials: metal, plastic or polymer, or glass. The vessel 202 may be insulated using an insulation such as fiberglass, cotton, or Cryogel® which is aerogel cryogenic insulation to reduce undesired heat transfer.

A graphite grain 228 and a fluid medium 226 may be transferred into the vessel 202 to form a mixture. The mixture may contain any ratio of the graphite grain 228 and the fluid medium 226. The volume of the fluid medium 226 may be any volume that is containable by the vessel 202 and the vessel 202 may vary in size. The fluid medium 226 may be any fluid, non-fluid, or a combination thereof. The fluid medium 226 may at least partially solidify into a crystalline structure in response to cooling below a freezing temperature. In an implementation, the fluid medium 226 is deionized water meeting a minimum purity standard of at least the American Society for Testing and Materials (ASTM) Type IV as described in ASTM D1193-91. In another implementation, the fluid medium 226 is a solution containing water and at least one solute such as chloride, fluoride, or one or more minerals. As used herein, "solute" refers to a minor component in a solution, dissolved in a solvent. In a third implementation, the fluid medium 226 is another liquid. In yet other implementations, the fluid medium 226 may be a non-fluid or a combination of a fluid and non-fluid medium.

The graphite grain 228 may be added to the vessel 202 prior to, at the same time as, or following the addition of the fluid medium 226. In an implementation, the graphite grain 228 may be cooled prior to introduction into the vessel 202. In another implementation, the graphite grain 228 may be equalized in temperature with an ambient temperature such as 25° Celsius or another temperature. The graphite grain 228 may be in a powdered form (e.g., a powdered solid form) having an average flake size. In an implementation, the graphite grain 228 has an average flake size of between 5 micrometers and 100 micrometers. In another implementation, the graphite grain 228 has an average flake size of more than 100 micrometers. In a third implementation, the graphite grain 228 is a heterogenous plurality of graphite grains of any size containable by the vessel 202.

The agitator 216 may be at least temporarily affixable, permanently affixable or removably affixable to the vessel 202. In an implementation, the agitator 216 includes one or more rotors that are in contact with the fluid medium 226 to increase agitation and that are at least occasionally in contact with the graphite grain 228. A rotor may include one or more blades extending outward from a shaft, such that as the shaft rotates the blades move through the fluid medium 226. The movement of the one or more blades may increase the kinetic energy of the fluid medium 226 to cause agitation.

Through rotation, the agitator 216 may initiate agitation in the fluid medium 226 and occasional contact with the graphite grain 228 such that the graphite grain 228 moves relative to the fluid medium 226.

As used herein, "circular rotation" refers to a periodic motion of one or more objects along the circumference of a circle or rotation along a circular path. Circular rotation may be uniform (e.g., with constant angular rate of rotation and constant speed) or non-uniform with a changing rate of rotation or changing speed. In an implementation, a circular rotation is produced by the motion of a motor 212. The motor 212 may be driven by or otherwise powered by a chemical fuel such as gasoline, liquefied petroleum gas (LPG) (i.e., propane), or diesel fuel. Alternatively, the motor 212 may be an electric motor driven by a motor electric input 214 which may couple to a wired electrical source and/or to a battery. In an implementation, the motor 212 is an alternating current ("A/C") motor. The motor 212 may be supported structurally by a support arm 204. The support arm 204 may be constructed of any kind of material that can support the motor 212. The support arm 204 maybe constructed of a metal, plastic, rubber, cardboard, or a combination thereof.

An input shaft 210 may be at least temporarily coupled, permanently coupled or removably coupled at one end to the motor 212. The input shaft 210 may be welded, joined via a temporary or permanent joint, or otherwise connected to the motor 212. The input shaft 210 may be constructed of any kind of material that can laterally support the motor 212. The input shaft 210 maybe constructed of a metal, plastic, rubber cardboard, or a combination thereof. In an implementation, an opposing end of the input shaft 210 is at least temporarily coupled, permanently coupled or removably coupled to a gear box 208. The input shaft 210 may be welded, joined via a temporary or permanent joint, or otherwise connected to the gear box 208. The gear box 208 may include two or more gears (not depicted). Each gear (not depicted) in the gear box 208 may have a specific number of teeth. The rotation of a gear may be interlocked with one or more other gears such that the rotation of a one gear transfers force through the teeth to produce rotation of one or more other gears. The ratio of the number of teeth between one gear and another gear is known as a "gear ratio." The aggregated gear ratios of all interlocked gears in the gear box 208 is referred to as the "gear ratio" of the gear box 208. The gear box 208 operates to mechanically convert the rotation of the input shaft 210 to a second rotation, such that the rate of the second rotation is different from the rate of the rotation of the input shaft 210 according to a gear ratio. In an implementation, the gear box 208 may mechanically convert the rotation of the input shaft 210 to a second rotation, such that the direction of the second rotation is different from the direction of the rotation of the input shaft 210 according to an angle. The gear box 208 may be at least temporarily coupled, permanently coupled or removably coupled to an output shaft 206. The output shaft 206 may be welded, joined via a temporary or permanent joint, or otherwise connected to the gear box 208.

In an alternative implementation (not depicted), the motor 212 may be at least temporarily coupled, permanently coupled or removably coupled directly to the output shaft 206 without having an input shaft. In such an implementation, the rate of rotation of the motor 212 is the same or substantially the same (e.g., within +/−5%) as the rate of rotation of the output shaft 206 and the direction of rotation of the motor 212 is the same or substantially the same (e.g., within +/−5%) as the direction of rotation of the output shaft 206.

In an implementation, the rate of rotation of the output shaft 206 may contribute to the degree of agitation produced by the agitator 216. In an implementation, one or more rotors are coupled to the output shaft 206 to provide additional agitation. A rotor may include one or more blades extending outward from a shaft, such that as the shaft rotates the blades move through the fluid medium 226. The movement of the one or more blades may increase the kinetic energy of the fluid medium 226 to cause agitation. The degree of agitation produced by the agitator 216 may be such that, as crystalline structures form in the fluid medium 226 in response to cooling, the agitation produces shear forces applied to the crystalline structure sufficient to overcome an internal bond strength of the graphite grain 228 as depicted in FIG. 1 above.

In an implementation, the fluid medium 226 is configured such that, in response to being cooled below a freezing temperature of the fluid medium 226, the fluid medium 226 at least partially solidifies to a crystalline structure and adheres to an outer layer of the graphite grain 228. The thermal sink 218 is able to cool the fluid medium 226 and the graphite grain 228 to below the freezing temperature of the fluid medium 226.

A portion of the thermal sink 218 may be affixed to the bottom of the vessel 202. The vessel 202 may transfer heat into the thermal sink 218. Heat may be transferred into the thermal sink through any of conduction, convection, radiation, or a combination thereof. The portion of the thermal sink 218 that is affixed to the bottom of the vessel 202 may contain passages (not shown) that permit flow of a liquid coolant throughout the passages. In an implementation, the liquid coolant is one of sodium chloride, ethylene glycol, isopropyl alcohol, methyl alcohol, butyl alcohol, ethyl alcohol, liquid nitrogen, or another liquid or combination of liquids.

The thermal sink 218 may include a coolant inlet 220 and a coolant outlet 222 that are at least temporarily coupled, permanently coupled or removably coupled at one end to the portion of the thermal sink 218 affixed to the bottom of the vessel 202. In an implementation, the coolant inlet 220 and the coolant outlet 222 include pipes that permit flow of the liquid coolant. The pipes may be constructed of metal, plastic, rubber, cardboard, or a combination thereof. The coolant inlet 220 and the coolant outlet 222 may be insulated using an insulation such as fiberglass, cotton, or Cryogel® which is aerogel cryogenic insulation to reduce heat transfer into or out of the coolant inlet 220 or the coolant outlet 222.

The coolant inlet 220 and the coolant outlet 222 may be at least temporarily coupled, permanently coupled or removably coupled at another end to a chiller 224. The chiller 224 is constructed of metal, plastic, rubber, cardboard, or a combination thereof. In an implementation, the chiller 224 is able to cool the liquid coolant in the coolant outlet 222 away from the apparatus 200 and return liquid coolant at a lower temperature in the coolant inlet 220. The chiller 224 may be a tank containing a cryogenic fluid such as liquid nitrogen. In an alternative implementation, the chiller 224 is an electric apparatus for cooling fluids, having a chiller electric input 230. The chiller 224 may cool the liquid coolant at a constant (same) rate. In an implementation, the chiller 224 may instead cool the liquid coolant at a variable rate.

By cooling the liquid coolant, the thermal sink 218 may cool the fluid medium 226 and the graphite grain 228 to below a freezing temperature of the fluid medium 226. Thus, by a combination of cooling and agitation, the apparatus 200 brings about formation and exfoliation of crystalline structures in the fluid medium 226 and exfoliation of the graphite grain 228. However, discussed herein, other apparatuses may be employed to achieve a similar or same effect in a scalable and cost-efficient manner.

Figure 3:
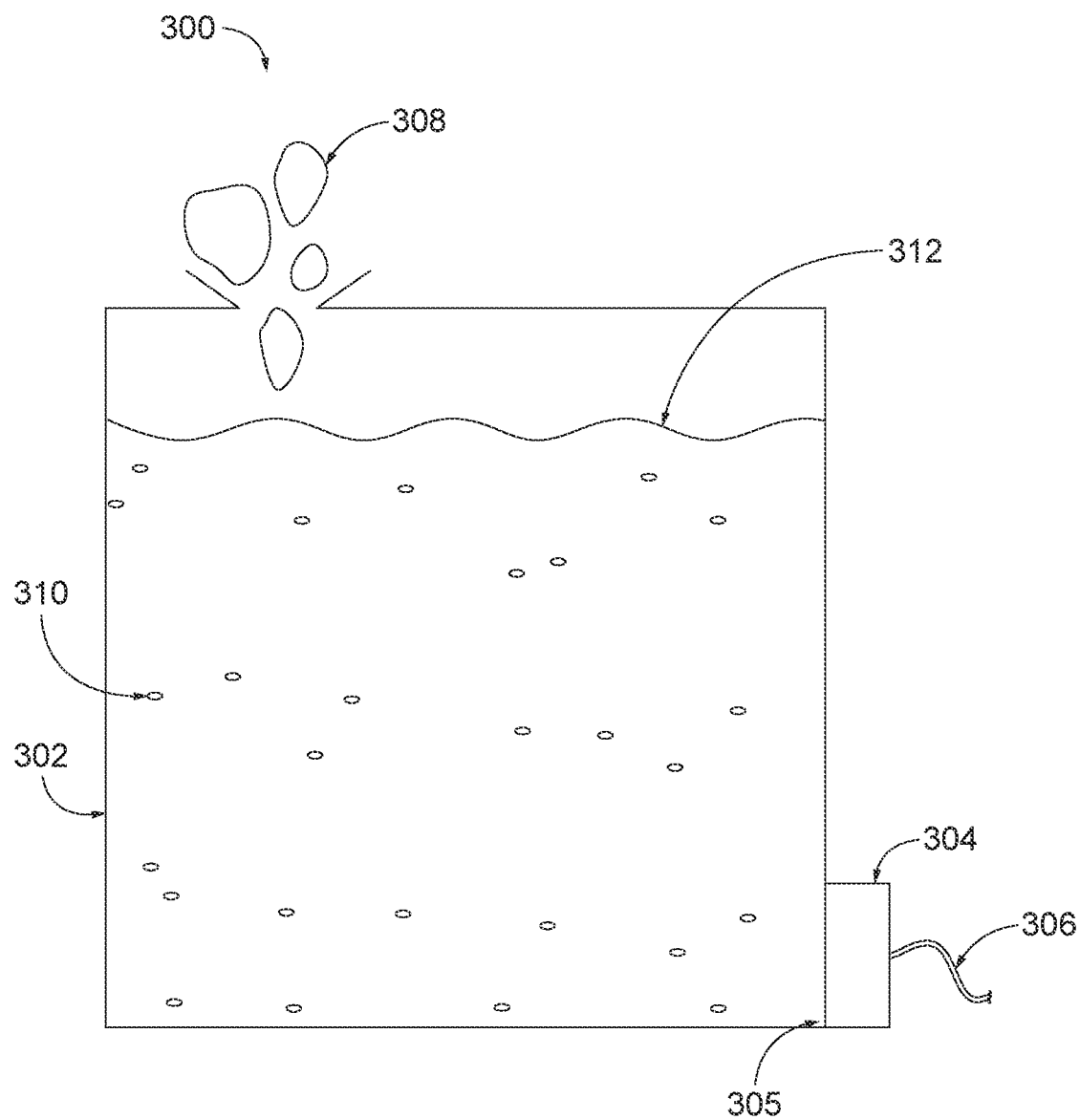
FIG. 3 illustratively depicts an apparatus for exfoliating graphite, in accordance with an implementation of the disclosure.

FIG. 3 illustratively depicts an apparatus 300 for exfoliating graphite. Components in apparatus 300 may be similar to or the same as those of apparatus 200 and therefore, the description of the components in apparatus 200 also apply to the components in apparatus 300. The apparatus 300 for exfoliating graphite includes a vessel 302, an agitator 304, and a thermal sink 308. The vessel 302 includes a fluid medium 312 and a graphite grain 310. The agitator 304 includes an agitator electric input 306.

The vessel 302 may be created or otherwise manufactured to hold any volume of a fluid medium 312 as determined by a designer of the apparatus 300. In an implementation, the vessel 302 is constructed from one or more of metal, plastic or polymer, or glass. The vessel 302 may be insulated to reduce undesired heat transfer.

A graphite grain 310 and a fluid medium 312 may be transferred into the vessel 302 to form a mixture. The volume of the fluid medium 312 may be any volume that is containable by the vessel 302 and the vessel 302 may vary in size. The fluid medium 312 may be any fluid wherein the fluid medium 312 at least partially solidifies into a crystalline structure (not shown) in response to cooling below a freezing temperature. In an implementation, the fluid medium 312 is deionized water meeting a minimum purity standard. In another implementation, the fluid medium 312 is a solution containing water and at least one solute. As used herein, "solute" refers to a minor component in a solution, dissolved in a solvent. In a third implementation, the fluid medium 312 is another liquid.

The graphite grain 310 may be added to the vessel 302 prior to or following the addition of the fluid medium 312. The graphite grain 310 may be cooled prior to introduction into the vessel 302. The graphite grain 310 may be in a powdered form having an average flake size. In an implementation, the graphite grain 310 has an average flake size of between 5 micrometers and 100 micrometers. In another implementation, the graphite grain 310 has an average flake size of more than 100 micrometers. In a third implementation, the graphite grain 310 is a heterogenous plurality of graphite grains of any size containable by the vessel 302.

The agitator 304 is at least temporarily affixed, removably affixed or permanently affixed to the vessel 302. In an implementation, the agitator 304 includes one or more vibrators (305) in contact with an external surface of the vessel 302. Through vibration, the agitator 304 may initiate agitation in the fluid medium 312 such that the graphite grain 310 moves relative to the fluid medium 312.

The frequency and amplitude of vibration of the agitator 304 contribute to the degree of agitation produced by the agitator 304. In an implementation, the agitator 304 is able to produce a frequency of vibration greater than 40 kHz. The degree of agitation produced by the agitator 304 may be configured such that, as crystalline structures form in the fluid medium 312 in response to cooling, the agitation is sufficient to overcome an internal bond strength of the graphite grain 310 as depicted in FIG. 1 above.

In an implementation, the fluid medium 312 is configured such that, in response to being cooled below a freezing temperature, the fluid medium 312 at least partially solidifies to a crystalline structure and adheres to an outer layer of the graphite grain 310. As used herein, "freezing temperature"

refers to the temperature at which a material may begin to change thermodynamic phase from a liquid to a solid. The process of changing thermodynamic phase from a liquid to a solid is also referred to as "solidifying." A liquid solidifying into a crystalline structure may preferentially solidify onto other solids in a process referred to as "nucleation." Solids onto which a crystalline structure may begin to solidify are referred to as "nucleation sites." In the present disclosure, as the fluid medium 312 solidifies, two or more of the fluid medium 312 molecules bond to one another in a repeating pattern to form a crystalline structure layer (not depicted). The thermal sink 308 is able to cool the fluid medium 312 and the graphite grain 310 to below a freezing temperature. In an implementation, the freezing temperature is that of pure water, which is approximately 0° Celsius under one atmosphere of pressure.

The thermal sink 308 may be a substance having an instant temperature sufficiently low to cool the fluid medium 312 to below a freezing temperature. In an implementation, the thermal sink 308 is added to the fluid medium 312 after the fluid medium 312 and the graphite grain 310 have been introduced into the vessel 302. The thermal sink 308 may be a solid substance or a liquid substance. In an implementation, the thermal sink 308 is a volume of solidified carbon dioxide, also known as dry ice. In another implementation, the thermal sink 308 is a volume of a cryogenic liquid such as liquid nitrogen, liquid oxygen, or liquid helium.

By simple heat transfer, the thermal sink 308 may cool the fluid medium 312 and the graphite grain 310 to below a freezing temperature. Thus, by a combination of cooling and agitation, the apparatus 300 brings about formation and cleaving of crystalline structures in the fluid medium 312 and exfoliation of the graphite grain 310. However, as will be discussed below, still other apparatuses may be employed to achieve the same effect in a scalable and cost-efficient manner.

Figure 4:
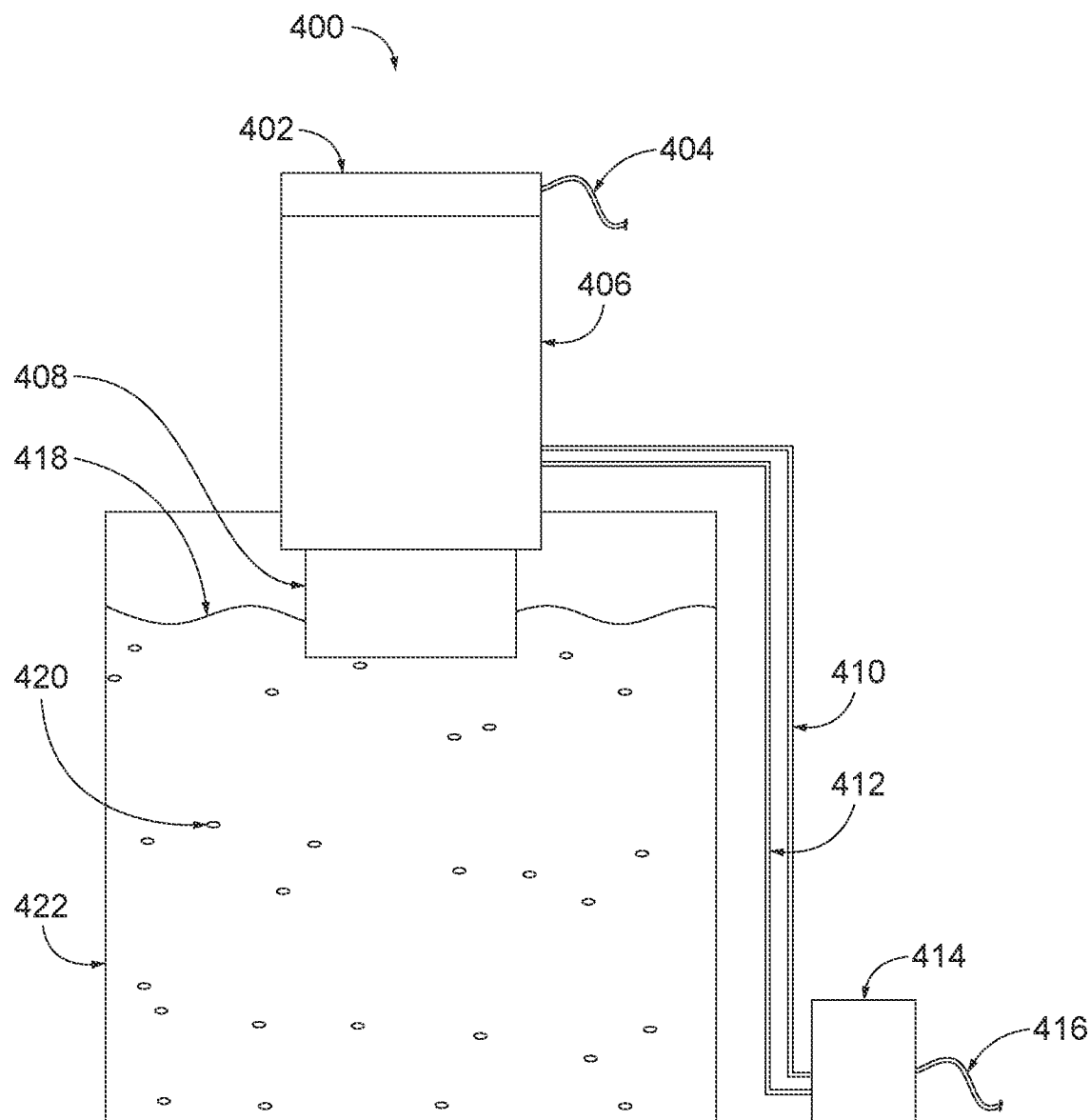
FIG. 4 illustratively depicts an apparatus for exfoliating graphite, in accordance with an implementation of the disclosure.

FIG. 4 illustratively depicts an apparatus 400 for exfoliating graphite. Components in apparatus 400 may be similar to or the same as those of apparatus 200 and apparatus 300 and therefore, the description of the components in apparatus 200 and apparatus 300 also apply to the components in apparatus 400. The apparatus 400 for exfoliating graphite includes a vessel 422, an agitator 402, a thermal sink 406, and a graphite block 408. The vessel 422 includes a fluid medium 418 and a graphite grain 420. The agitator 402 includes an agitator electric input 404. The thermal sink 406 includes a coolant inlet 410, a coolant outlet 412, and a chiller 414. The chiller 414 includes a chiller electric input 416.

The vessel 422 forms the core of the apparatus 400. The vessel 422 may be created or otherwise manufactured to hold any volume of a fluid medium 418 as determined by a designer of the apparatus 400. In an implementation, the vessel 422 is constructed from one or more of metal, plastic or polymer, or glass. The vessel 422 may be insulated using an insulation such as fiberglass, cotton, or Cryogel® which is aerogel cryogenic insulation to reduce heat transfer out of the vessel 422.

A graphite grain 420 and a fluid medium 418 may be transferred into the vessel 422 to form a mixture. The volume of the fluid medium 418 may be any volume containable by the vessel 422. The fluid medium 418 may be any fluid wherein the fluid medium 418 at least partially solidifies into a crystalline structure (not shown) in response to cooling below a freezing temperature. In an implementation, the fluid medium 418 is deionized water meeting a minimum purity standard. In another implementation, the fluid medium 418 is a solution containing water and at least one solute. As used herein, "solute" refers to a minor component in a solution, dissolved in a solvent. In a third implementation, the fluid medium 418 is another liquid.

The graphite grain 420 may be added to the vessel 422 prior to or following the addition of the fluid medium 418. The graphite grain 420 may be cooled prior to introduction into the vessel 422. The graphite grain 420 may be in a powdered form having an average flake size. In an implementation, the graphite grain 420 has an average flake size of between 5 micrometers and 100 micrometers. In another implementation, the graphite grain 420 has an average flake size of more than 100 micrometers. In a third implementation, the graphite grain 420 is a heterogenous plurality of graphite grains of any size containable by the vessel 422.

The agitator 402 is at least temporarily affixed, removably affixed or permanently affixed to the thermal sink 406. In an implementation, the agitator 402 includes one or more vibrational units in contact with the top of the thermal sink 406. Through vibration, the agitator 402 may initiate agitation in the fluid medium 418 such that the graphite grain 420 moves relative to the fluid medium 418.

The frequency and amplitude of vibration of the agitator 402 contribute to the degree of agitation produced by the agitator 402. In an implementation, the agitator 402 is able to produce a frequency of vibration greater than 40 kHz. The degree of agitation produced by the agitator 402 may be such that, as crystalline structures form in the fluid medium 418 in response to cooling, the agitation is sufficient to overcome an internal bond strength of the graphite grain 420.

In an implementation, the fluid medium 418, in response to being cooled below a freezing temperature, the fluid medium 418 at least partially solidifies to a crystalline structure such as an ice grain and may adhere to an outer layer of the graphite grain 420. The thermal sink 406 is able to cool the fluid medium 418 and the graphite grain 420 to below the freezing temperature.

A portion of the thermal sink 406 may be affixed to the bottom of the agitator 402. The agitator 402 may conduct heat into the thermal sink 406. The portion of the thermal sink 406 affixed to the bottom of the agitator 402 may contain passages (not shown) to permit flow of a liquid coolant. In an implementation, the liquid coolant is one of ethylene glycol, isopropyl alcohol, methyl alcohol, butyl alcohol, liquid nitrogen, or another liquid.

The thermal sink 406 may include a coolant inlet 410 and a coolant outlet 412 at least temporarily coupled, removably coupled or permanently coupled at one end to the portion of the thermal sink 406 affixed to the bottom of the agitator 402. In an implementation, the coolant inlet 410 and the coolant outlet 412 are pipes that permit flow of the liquid coolant. The coolant inlet 410 and the coolant outlet 412 may be insulated to reduce undesired heat transfer.

The coolant inlet 410 and the coolant outlet 412 may be at least temporarily coupled, removably coupled or permanently coupled at another end to a chiller 414. In an implementation, the chiller 414 is able to cool the liquid coolant in the coolant outlet 412 away from the apparatus 400 and return liquid coolant at a lower temperature in the coolant inlet 410. In an implementation, the chiller 414 may be able to return liquid coolant in the coolant inlet 410 at a temperature below −20° Celsius. The chiller 414 may be a tank containing a cryogenic material such as liquid nitrogen, liquid hydrogen, liquid oxygen, or liquid helium. Alternatively, the chiller 414 may be a hopper containing solidified carbon dioxide, also known as dry ice. In other implementations, the chiller 414 may be any other mechanism that can cool the liquid coolant. In an implementation, the chiller 414 is an electric apparatus for cooling fluids, having a chiller electric input 416. The chiller 414 may cool the liquid coolant at a constant rate. In an implementation, the chiller 414 may instead cool the liquid coolant at a variable rate.

In an implementation, the coolant outlet 412 may be directed to a vent (not shown). In this implementation, the chiller 414 supplies a chilled gas to the coolant inlet 410. The chilled gas may be passed through the fluid medium 418 as a plurality of bubbles to cool the fluid medium 418 through conduction. In an implementation, the plurality of bubbles may act as nucleation sites, as described above, for the formation of crystalline structures. The chilled gas may include at least one of air, helium, nitrogen, neon, argon, or carbon dioxide. The coolant outlet 412 may also be at least partially directed to a gas recapture system (not shown).

A graphite block 408 may be at least temporarily affixed, removably affixed or permanently affixed to the bottom of the thermal sink 406. In an implementation, the graphite block 408 is held at least partially in fluid contact with the surface of the fluid medium 418. As graphite is a thermal conductor, the graphite block 408 may serve to transfer heat from the fluid medium 418 into the thermal sink 406. As the fluid medium 418 cools to below a freezing temperature, crystalline structures such as ice grains may form on the surface of the graphite block 408. The agitation produced by the agitator 402 may be sufficient to overcome an interlayer bond strength in the graphite block 408 such that the crystalline structures are mechanically separated from the graphite block 408. Thus, the graphite block 408 may be at least a partial source of the graphite grain 420.

By cooling the liquid coolant, the thermal sink 406 may cool the graphite block 408, the fluid medium 418, and the graphite grain 420 to below a freezing temperature. Thus, by a combination of cooling and agitation, the apparatus 400 brings about formation and cleaving of crystalline structures in the fluid medium 418 and exfoliation of the graphite grain 420. Thus, as has been discussed above, several approaches may be employed to achieve the same effect in a scalable and cost-efficient manner.

Steps used to exfoliate graphite are described herein below with respect to FIG. 5.

Figure 5:
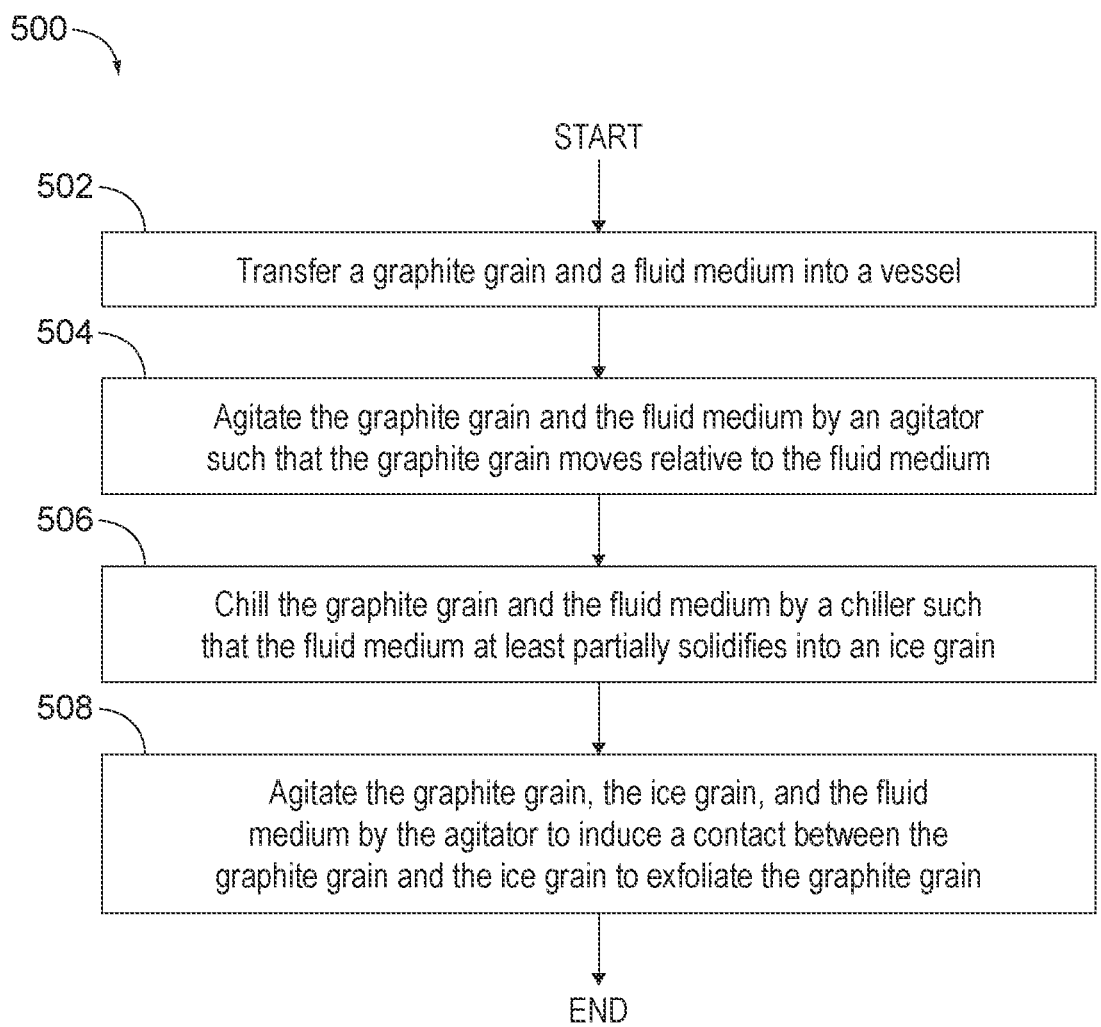
FIG. 5 is a flow diagram illustrating a method for exfoliating graphite, in accordance with an implementation of the disclosure.

FIG. 5 is a flow diagram illustrating a method 500 for exfoliating graphite. In one implementation, the method 500 may be performed using any of the apparatuses for exfoliating graphite described in this application. For example, apparatus 200, apparatus 300, and/or apparatus 400 depicted in FIGS. 2, 3, and 4, respectively, can perform the steps of method 500. Furthermore, the method 500 may also be performed by another apparatus(es) for exfoliating graphite.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Referring to FIG. 5, method 500 begins at block 502 where a graphite grain and a fluid medium are transferred into a vessel. For example, a graphite grain (228, 310, and/or 420) and a fluid medium (226, 312, and/or 418) are transferred into a vessel (202, 302, and/or 422). The vessel (202, 302, and/or 422) may receive and store any quantity of the graphite grain (228, 310, and/or 420) and fluid medium (226, 312, and/or 418) according to a ratio. The graphite grain (228, 310, and/or 420) and the fluid medium (226, 312, and/or 418) may be introduced into the vessel (202, 302, and/or 422) by a transfer system or by manual delivery or another process.

At block 504, the graphite grain and the fluid medium are agitated by the agitator such that the graphite grain moves relative to the fluid medium. For example, the agitator (216, 304, and/or 402) agitates the graphite grain (228, 310, and/or 420) and the fluid medium (226, 312, and/or 418) such that the graphite grain (228, 310, and/or 420) moves relative to the fluid medium (226, 312, and/or 418). The agitator (216, 304, and/or 402) may cause the graphite grain (228, 310, and/or 420) to move relative to the fluid medium (226, 312, and/or 418) at a stirring rate. In an implementation, the stirring rate is constant (e.g., within +/−5%) throughout a cycle of operation. In another implementation, two or more stirring rates or directions may be employed during a cycle of operation.

At block 506, a chiller chills the graphite grain and the fluid medium such that the fluid medium at least partially solidifies into an ice grain. For example, the thermal sink (218, 308, and/or 406) cools the graphite grain (228, 310, and/or 420) and the fluid medium (226, 312, and/or 418) to temperature below a freezing temperature. In an implementation, the fluid medium (226, 312, and/or 418) is configured such that the fluid medium (226, 312, and/or 418) at least partially solidifies to a crystalline structure (108) such as an ice grain in response to cooling below the freezing temperature of the fluid medium (226, 312, and/or 418). In a further implementation, the fluid medium is able to adhere to an outer layer of the graphite grain as the fluid medium (226, 312, and/or 418) solidifies to a crystalline structure (108) such as an ice grain. In an implementation, the crystalline structure (108) is transferred into the vessel (202, 302, and/or 422) from an external source.

At block 508, the agitator agitates the graphite grain, the ice grain, and the fluid medium to induce a contact between the graphite grain and the ice grain to exfoliate the graphite grain. For example, the agitator (216, 304, and/or 402) agitates the graphite grain (228, 310, and/or 420), the crystalline structure (108), and the fluid medium (226, 312, and/or 418) together to induce a contact between the graphite grain (228, 310, and/or 420) and the crystalline structure (108) to exfoliate the graphite grain. In an implementation, the thermal sink (218, 308, and/or 406) continues to cool the graphite grain (228, 310, and/or 420) and the fluid medium (226, 312, and/or 418) during block 508 such that the crystalline structure (108) continues to grow in size, such as from 5 micrometers to 10 micrometers in diameter. In response to increased fluid drag during agitation, a force is transferred to the graphite grain (228, 310, and/or 420) and the interlayer bond strength of the graphite grain caused by van der Waals forces is overcome.

When the interlayer bond strength of the graphite grain (228, 310, and/or 420) is overcome, the crystalline structure (108) may be mechanically separated from the graphite grain (228, 310, and/or 420) by a mechanical force. Mechanical forces on the crystalline structure (108) and the graphite grain (228, 310, and/or 420) may include any of fluid friction, a kinetic contact with an agitator, a kinetic contact with another crystalline structure (108), or kinetic contact with another graphite grain (228, 310, and/or 420). In an implementation, the fluid medium (226, 312, and/or 418) is configured such that the adhesive strength of the crystalline structure is greater than the interlayer bond strength of the graphite caused by van der Waals forces. As a result, the mechanical separation of the crystalline structure from the graphite grain (228, 310, and/or 420) is expected to cleave the graphite grain (228, 310, and/or 420), with at least one of the outer layers of the graphite grain (228, 310, and/or 420) remaining adhered to the crystalline structure. Thus, at least one outer layer of the graphite grain (228, 310, and/or 420) may be exfoliated with the crystalline structure.

In an implementation, the steps described in block 504 to block 508 are repeated recurringly during at least a portion of the operating cycle of the apparatus for exfoliating graphite. Thus, the outer layers of the graphite grain (228, 310, and/or 420) exposed by exfoliation may receive further crystalline structure adhesion and exfoliation. In an implementation, the graphite grain (228, 310, and/or 420) may be reduced to nanographite, multi-layer graphene, and finally to graphene. In an implementation, the graphite grain (228, 310, and/or 420) is reduced to multi-layer graphene within two hours.

In yet another implementation, to exfoliate a graphite grain, the following steps are taken. A mixture is transferred into a vessel. The mixture includes a graphite grain and an ice grain. The vessel includes an agitator. The mixture is agitated by the agitator to induce a contact between the graphite grain and the ice grain to exfoliate the graphite grain.

In yet another implementation, to exfoliate a graphite grain, the following steps are taken. A mixture is transferred into a vessel. The mixture includes a graphite grain and a fluid medium. The vessel includes an agitator and a chiller. The mixture is chilled by the chiller such that the fluid medium at least partially solidifies into an ice grain. The mixture is agitated by the agitator to induce a contact between the graphite grain and the ice grain to exfoliate the graphite grain.

In an implementation, the agitator includes a rotor. In an implementation, the rotor includes a first blade and a second blade.

In an implementation, the agitator includes a vibrator.

In an implementation, the fluid medium includes a first fluid where the first fluid includes water. The fluid medium further includes a second fluid. The second fluid includes at least one of ethylene glycol, n-methyl-2-pyrrolidone, isopropyl alcohol, methyl alcohol, butyl alcohol, or ethyl alcohol. In another implementation, the second fluid includes at least one of air, nitrogen, argon, oxygen, or carbon dioxide.

In an implementation, the fluid medium further includes a surfactant. The surfactant includes at least one of a soap, an alkyl sulfate, an alkylbenzene sulfonate, a lignosulfonate, or sodium cholate.

While the implementations are susceptible to various modifications and alternative forms, specific examples thereof have been shown in the drawings and are herein described in detail. It should be understood, however, that these implementations are not to be limited to the particular form disclosed, but to the contrary, these implementations are to cover all modifications, equivalents, and alternatives falling within the spirit of the disclosure. Furthermore, any features, functions, steps, or elements of the implementations may be recited in or added to the claims, as well as negative limitations that define the inventive scope of the claims by features, functions, steps, or elements that are not within that scope.

What is claimed is:

1. A method to exfoliate a graphite grain, the method comprising:
    transferring a mixture into a vessel,
        wherein the mixture comprises a graphite grain and a fluid medium, and
        wherein the vessel comprises an agitator and a chiller;
    chilling the mixture by the chiller such that the fluid medium at least partially solidifies into an ice grain; and
    agitating the mixture by the agitator to induce a contact between the graphite grain and the ice grain to exfoliate the graphite grain.

2. The method of claim 1, wherein the agitator comprises a rotor.

3. The method of claim 1, wherein the agitator comprises a vibrator.

4. The method of claim 1, wherein the fluid medium comprises a first fluid.

5. The method of claim 4, wherein the first fluid comprises water.

6. The method of claim 4, wherein the fluid medium further comprises a second fluid.

7. The method of claim 6, wherein the second fluid comprises at least one of ethylene glycol, n-methyl-2-pyrrolidone, isopropyl alcohol, methyl alcohol, butyl alcohol, or ethyl alcohol.

8. The method of claim 6, wherein the second fluid comprises at least one of air, nitrogen, argon, oxygen, or carbon dioxide.

9. The method of claim 4, wherein the fluid medium further comprises a surfactant.

10. The method of claim 9, wherein the surfactant comprises at least one of a soap, an alkyl sulfate, an alkylbenzene sulfonate, a lignosulfonate, or sodium cholate.

* * * * *